United States Patent [19]
Watkins

[11] Patent Number: 5,275,569
[45] Date of Patent: Jan. 4, 1994

[54] FOREIGN LANGUAGE TEACHING AID AND METHOD

[76] Inventor: C. Kay Watkins, 2024 Southridge, Denton, Tex. 76205

[21] Appl. No.: 828,777

[22] Filed: Jan. 30, 1992

[51] Int. Cl.⁵ ............................................. G09B 19/06
[52] U.S. Cl. .................................... 434/157; 434/156
[58] Field of Search ................................ 434/157, 156

[56] References Cited

U.S. PATENT DOCUMENTS

| | | | |
|---|---|---|---|
| D. 308,541 | 6/1990 | Wattenmaker | D19/59 |
| 418,491 | 4/1943 | Routin | 434/157 |
| 2,777,901 | 1/1957 | Dostert | 434/157 |
| 2,950,543 | 8/1960 | Ritter et al. | 434/157 X |
| 3,081,560 | 3/1963 | Campo Agud | 434/157 |
| 4,135,314 | 1/1979 | Yamamoto | 434/157 |
| 4,139,954 | 2/1979 | Yamamoto | |
| 4,311,465 | 1/1982 | Jacobs | 434/157 |
| 4,354,841 | 10/1982 | Meeder | 434/157 |
| 4,579,533 | 4/1986 | Anderson | 434/157 |
| 4,599,612 | 7/1986 | Kaji | |
| 4,604,063 | 8/1986 | Gurmarnik | 434/157 |
| 4,685,060 | 8/1987 | Yamano | 364/419 |
| 4,706,212 | 11/1987 | Toma | 364/900 |
| 4,710,130 | 12/1987 | Aarons | 434/157 |
| 4,734,036 | 3/1988 | Kasha | 434/157 |
| 4,791,587 | 12/1988 | Doi | 434/157 |
| 4,891,011 | 1/1990 | Cook | 434/157 |

FOREIGN PATENT DOCUMENTS

| | | | |
|---|---|---|---|
| 1484948 | 6/1966 | France | 434/157 |
| 15613 | 2/1906 | Norway | 434/157 |
| 363010 | 7/1962 | Switzerland | 434/157 |

*Primary Examiner*—Gene Mancene
*Assistant Examiner*—L. Thomas
*Attorney, Agent, or Firm*—John W. Montgomery

[57] ABSTRACT

A language translation teaching aid and method comprises a first presentation of a line of words, a phrase, or a sentence in a first language according to its normal rules of syntax and grammar; a second presentation in a second language of a word-for-word translation of the words, a phrase, or a sentence presented in the first language; a third presentation in the second language of an accurate translation of the first presentation according to the normal rules of syntax and grammar of the second language; and a fourth presentation in the first language of a word-for-word translation of the third presentation in the second language.

2 Claims, 3 Drawing Sheets

FIG. 1

20 { The Wolf and the Shepherds
     El Lobo y los Pastores

12 —
22 { A Wolf looked through a [cottage window] and saw
14 — Un Lobo miró a través de una [casita ventana] y vió

24 { some shepherds eating a lamb.
     unos pastores comiendo un cordero.

26 { He [wondered] what [they would think] if they —12
     Él [se preguntó] que [ellos pensarian] si ellos —14

28 { [saw him] eating a lamb. —12
     [vieron lo] comiendo un cordero. —14

30 { Moral: "People condemn in others what they [do themselves."]
     Moral: "Gente condena en otros que ellos [hacen mismos."]

21 { El Lobo y los Pastores
     The Wolf and the Shepherds

23 { Un Lobo miró a través de una [ventana de casita] y vió —16
     A Wolf looked through a [window of cottage] and saw —18

25 { unos pastores comiendo un cordero.
     some shepherds eating a lamb.

27 { Él [se preguntó] que [pensarian ellos] si ellas —16
     He [himself asked] what [would think they] if they —18

29 { [lo vieron] comiendo un cordero. —16
     [him saw] eating a lamb. —18

31 { Moral: "Gente condena en otros lo que ellos [mismos hacen."]
     Moral: "People condemn in others that which they [themselves do."]

FOREIGN LANGUAGE TEACHING AID AND METHOD

TECHNICAL FIELD OF THE INVENTION

The present invention relates generally to a foreign language teaching aid and method of teaching, and in particular, an aid and method in which sentences and phrases are presented in a plurality of source languages along with both the word-for-word translations and the grammatically and syntaxically correct translations of such phrases and sentences.

BACKGROUND OF THE INVENTION

There are many known translation programs and devices by which words, phrases, or sentence primary or source language are translated into a secondary or target language. Simple, word-for-word translations often result in improper or confusing syntax, grammar, word order, and meaning in the target translation of phrases or sentences. While some complex methods and computer programs have been devised to attempt accurate translation, the elaborate rules of syntax, grammar, and construction can require years of intense study before an understanding of the nuances of accurate and meaningful translations is achieved. These complex rules and the art of translation also vary depending upon the source language and the target language into which it is being translated. Even in the case of translating back and forth between two specific languages, the rules are different in each translation direction. For example, when translating from a first language as the source to a second language as the target and then translating back using the second language as the source and the first as the target, the translations and the rules for the translations are not always the same. The complex differences are not easy to grasp using previously known teaching aids.

While the various known translation techniques and computer programs have been helpful in accomplishing accurate translations in many instances, they have, nevertheless, fallen short as a teaching aid for teaching students the science, technique, and art of accurate, meaningful translation to and from various languages. The rules being used in such translations are often unknown to the user and not really discernable from using the translator methods, programs, or devices.

SUMMARY OF THE INVENTION

Thus, it is an object of the invention to provide a teaching aid in which a source or translated language in which phrases and sentences of a first language are presented as a primary or source language according to proper rules for such first language, and a word-for-word translation thereof is presented in a second language as the target or translation language and also, wherein the second language is presented as a primary or source language accurately translated from the first language according to the proper rules for such second language and with a word-for-word translation into the first language presented as the target or translation language.

It is another object of the invention to provide a teaching aid in which the presentation of source and target languages are in a convenient printed book format so that many phrases and sentences can be conveniently and inexpensively presented as a teaching aid. Preferably, a word for word translation appears vertically spaced with the words of the source language above the words of the target language. Also, preferably the corresponding accurately translated phrases or sentences in the first and second languages appear in a side by side arrangement.

It is a further object of the invention to provide a teaching aid which displays, or otherwise presents, the source to target and target to source translations in a sequential manner, such as through successive audio recitations, video screens, CRT displays, or pages, so that both word for word translations and accurate translations from a first language into a second language and translations from the second language into the first language are available to the user within a short time period for easy comparison and understanding of the applied translation rules.

Another feature of the invention is to provide an audio cassette in which a first person speaks a first language and a second person speaks a second language, such that at a given time the first speaker follows the syntax and grammar rules that are normal for the first language. Each of the first speaker's lines is followed by the second speaker, saying the same word or words in the second language. At another time, the second speaker also says the word or phrase or sentence in the second language, following appropriate rules of syntax and grammar. The first speaker also gives a word-by-word translation of the second speaker's accurately translated phrase or sentence. The sequence of the accurately spoken lines and word-for-word translations is maintained throughout so that the listener can easily identify which is the word-for-word translation, and which is the accurate translation.

Another feature of the invention is to provide a teaching aid in which differences in an accurate translation from a word-for-word translation are "highlighted" as by underlining, type face, color, or otherwise to emphasize the differences to the user. For example, words in sentences or phrases which change order according to the syntax and grammatical rules are highlighted in at least one of the presentations, and preferably in both the source and the target language presentations. This emphasizes the different word order as a further teaching aid to the user. Another example of this feature of the invention is that words which change according to case, gender, tense, or other grammatical features are highlighted in one or both of the presentations to emphasize the differences as a teaching aid to the user. The highlighting can also be done with sound as with a change in volume, a voice change, a beep, a tone, or another auditory signal before, after, and/or during the presentation.

In this application, the term "word-for-word translation" will be used to refer to a direct translation of individual words from one language to another where such a translation is possible. It will be understood that direct translations do not always exist and in such cases, a word-for-word translation may include an indication to that effect (such as a blank space) or a translation of a short phrase or group of words for which there is a translation. Also, there are often "silent" or understood words in one of the languages, but not in another. These cases might or might not include the understood word in the word-for-word translation, and it might be designated as silent, as with parentheses. Further, there might be multiple possible direct word translations and a word-for-word translation may include any one or more than one of such possibilities.

In this application, an "accurate translation" or a "correct translation" is one that conveys a meaningful translation using appropriate syntax and grammar for each language used. The degree of accuracy and correctness may vary depending upon the skill of the teacher or manufacturer of the teaching aid. However, the concept is distinguishable from the word-for-word translation which does not focus on the contextual meaning of the proper application of rules of syntax and grammar.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which like numerals represent like elements and in which:

FIG. 1 is a schematic plan view of one preferred embodiment of the inventive teaching aid presentation according to the invention;

DESCRIPTION OF THE PREFERRED EMBODIMENTS

Figure 2:
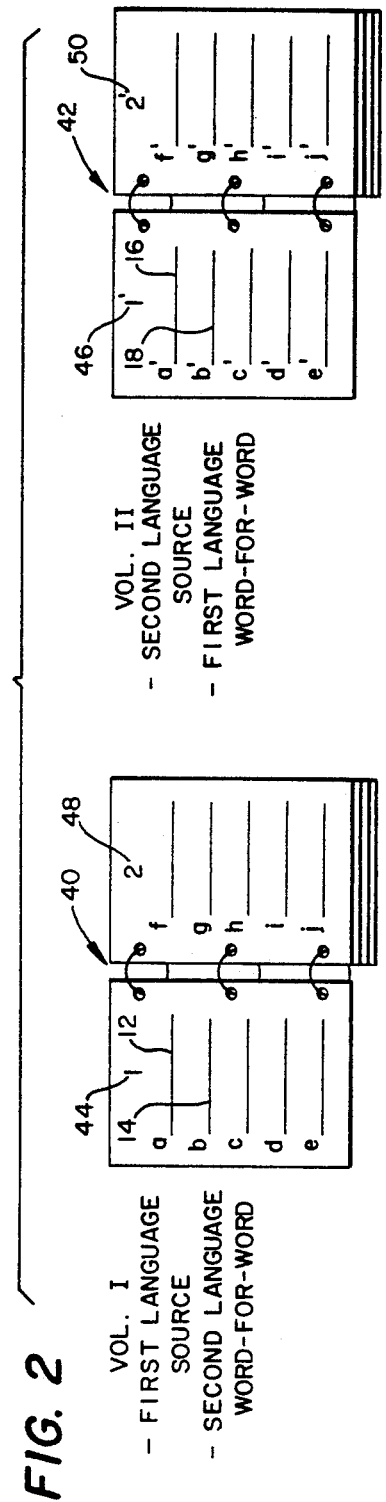
FIG. 2 is a schematic perspective view of one alternative embodiment of a two volume teaching aid book.

In FIG. 1, a teaching aid presentation 10 is schematically depicted. A group of words 12, such as a phrase or a sentence 12 is presented in a first language (English is depicted in FIG. 1, although any other language could be set forth as the first language). Also, a word-for-word translation 14 is presented in a second language (Spanish is depicted in FIG. 1, although any language different from the first language could be presented according to the invention). The word-for-word translation 14 preferably closely follows the presentation 12 of the first language and further is preferably and advantageously aligned word-for-word for increased understanding of the translation of each word being presented. Vertical alignment as depicted is preferred for many languages which are read horizontally; however, horizontal word-for-word alignment may be advantageously used for languages which are read vertically.

There is also a third presentation 16 of an accurate and grammatically correct translation of the first presentation 12. Preferably, the third presentation 16 is made in close physical or time proximity to the first presentation 12 and further preferably is arranged correspondingly with the first presentation for ease of understanding of the translation being made. For example, this can be advantageously done in the case of a printed presentation with side by side horizontally aligned first and third print lines, as shown in FIG. 1. Vertical line by line alignment might be used for vertically read languages. Alternatively, correspondence may be shown by corresponding numbering, lettering, or other signals or by grouping or by following a predetermined sequence or order.

Also a fourth presentation 18 of a word-for-word translation of the third translation from the second language as the source language into the first language as the target language is made. Again, this fourth presentation 18 is preferably aligned with the third presentation 16 in the same fashion as the first and second presentations; either vertically as shown in FIG. 1, or horizontally in the case of vertically read languages. Further, this fourth presentation 18 is advantageously arranged for comparison also to the second presentation 14. Horizontal alignment of the fourth and second presentations works well for languages which are read horizontally.

The teaching aid 10 can advantageously present an entire paragraph or story in which the title, phrases, or sentences are set forth sequentially in groups; each group including first 12, second 14, third 16, and fourth 18 presentations, such as groups 20 and 21; 22 and 23; 24 and 25; 26 and 27; 28 and 29; and 30 and 31. Each of the groups have an arrangement of first, second, third, and fourth presentations which is consistent with each of the other groups for the ease of understanding of the translations being made whether they are the word-for-word translations or the accurate, proper grammar and proper syntax translations, so that understanding is facilitated and teaching is thereby aided.

Also advantageously, variations or differences in the first 12 and third 16 presentations from the corresponding second 14 and fourth 18 presentations may be denoted or highlighted as at 32, 34, 36, and 38.

While the presentations depicted here are for teaching the translation of the two languages, the invention may also be useful for the teaching of a plurality of languages. In the case of more than two languages, there will be an additional accurate translation and an additional word-for-word translation for each of the accurate translations. In one advantageous arrangement (not shown), the first language presentation would have a corresponding word-for-word translation into both a second and a third language, and/or more languages. There would also be an accurate translation into the second, third and/or more other languages. Each second, third, and/or more languages would have a word-for-word translation into the first language and each of the other languages.

In FIG. 2, the presentation of the teaching aid according to the present invention is made in two (2) presentation volumes 40 and 42. A plurality of volumes may be presented if a plurality of languages are to be taught. In the first volume 40, the first language is the source language and a word-for-word translation is provided in a second language. In the second volume 42, the second language is the source language and a word-for-word translation is provided in the first language. The volumes may be separately bound into separate books or they may be bound together in the same book. For example, one volume might follow the other or alternatively, one volume might be read from one cover inwardly and a second volume read inwardly from the other cover; both terminating in the middle.

With a multiple volume embodiment of the teaching aid as set forth in FIG. 2, it is advantageous for the first volume 40 and the second volume 42 to have a corresponding arrangement, such as corresponding page numbers, for example, 1 at 44 and 1' at 46, and page 2 at 48 and page 2' at 50. The phrases or sentences on each of the corresponding pages 1 and 1' and 2 and 2' also advantageously correspond in arrangement, order, numbering, and/or lettering, according to the invention so that it performs a function of a teaching aid giving the user easy access to both the word-for-word translation and the grammatically and syntactically correct translation as desired. The lines may, for example, be designated with corresponding letters or other indications, such as a and a', b and b', etc.

Figure 3:
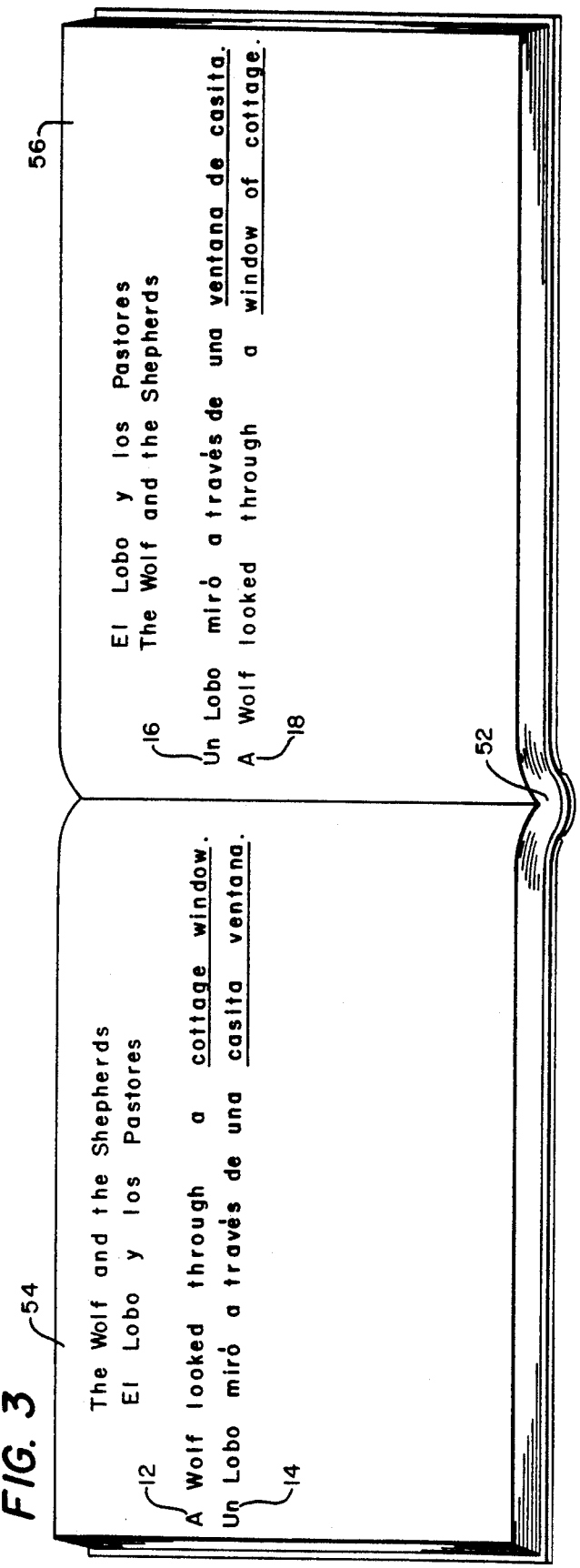
FIG. 3 depicts another alternative embodiment of the invention wherein the presentation is printed in a single book format.

In a preferred printed embodiment as shown in FIG. 3, a single book or volume 52 is advantageously arranged such that there are presentations of source languages, such as 12 or 16, and word-for-word translations, such as 14 or 18, respectively. Such presentations will advantageously be viewable at the same time as by placing them in columns on a single page or columns on opposed facing pages. For example, the first syntaxically and grammatically correct phrase or sentence 12 is shown on one page 54 and the syntaxically correct second language translation 16 is shown on the oppositely facing page 56. In this preferred presentation and arrangement in a printed format, the user can view all the presentations by simple eye movement. This facilitates and aids the user in learning the rules and art of translations between various languages. A similar simultaneous presentation can also be achieved with a plurality of columns on a single page, rather than columns on opposed pages as shown.

Although the arrangement has been set forth in which the word-for-word translation of each source language 12 or 16 has been vertically spaced below line 12 or line 16, respectively, the word-for-word translation could also be spaced horizontally and the accurate translation of the second language could be set forth vertically below the accurate phrase in the first language. Also, more than one line in the first language could be printed sequentially with one or more than one word-for-word translation either below or horizontally displaced from the first language lines and a subsequent group or groups of lines could have the second language accurate translation or more than one additional language translation in several lines grouped together with one or more word-for-word translations, as the case may be, either below or to the side. However, as indicated previously, certain advantages are obtained by having line-per-line corresponding presentations.

Figure 4:
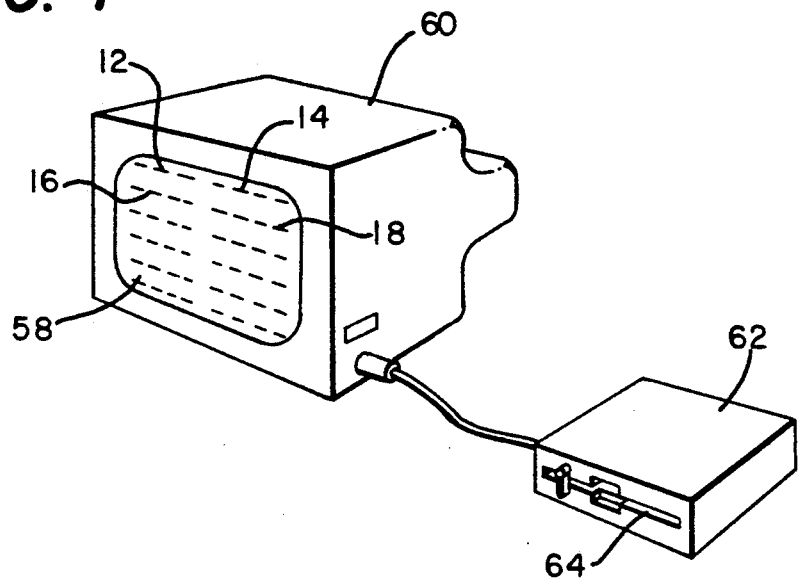
FIG. 4 is another alternative embodiment of the invention in which the presentation is made on a visual screen such as a CRT or television monitor.

With reference to FIG. 4, the presentations can also be made on a CRT screen 58, which may for example, be a computer or television monitor 60. In the embodiment shown, the first line 12 is shown horizontally spaced from the second line 14, which is the word-for-word translation, and the third line 16 which is the second language accurate translation of the first line 12 is horizontally spaced from the fourth line 18 which is the word-for-word translation of the second language of line 16 into the first language. It will be understood that the preferred arrangement as set forth in FIGS. 1 and 3 above could also be easily displayed on the CRT screen 58 of FIG. 4. The information may be input to the CRT screen using an information input means 62 which may, for example, be a drive for a computer disk 64. Alternatively, input means 62 may be a drive for a video tape, a CD disk, a laser disk, or similar information storage means.

Figure 5:
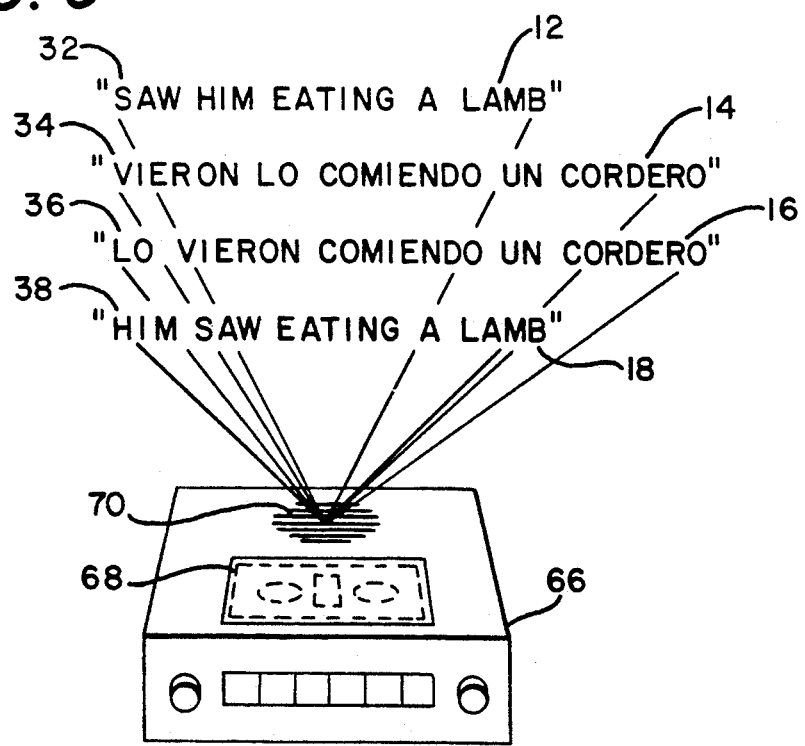
FIG. 5 is another embodiment of the invention in which the teaching aid is schematically depicted having an audio presentation.

According to the present invention as schematically depicted in FIG. 5, the presentation of first, second, third, and fourth lines of words, phrases, or sentences may be an oral presentation. An oral presentation can also be made, if a plurality of languages are being taught. The discussion and example below is for two languages. An oral presentation can be conveniently accomplished by human teachers or with an audio player 66, which may be a record player, tape player, laser disk player, CD rom player, or the like. The presentation can be conveniently set forth on an information storage means 68 which is depicted by way of an example as a tape cassette 68. The audio player 66 preferably retrieves the presentation from the data storage cassette 68 and converts it into sound as through a speaker 70. In this manner, a line 12 may be spoken by a first speaker. This first speaker's voice is schematically depicted by the italicized typeface. The second line 14 which is a word-for-word translation of line 12 may be presented in a second language by a second speaker, whose voice is schematically depicted in a standard type font. The third line 16 may also be presented by the second speaker in a second language as an accurate translation of the line 12 (standard type font in FIG. 5). And a fourth line 18, which is a word-for-word translation of line 16, could be spoken again by the first speaker. By maintaining the appropriate order consistently throughout the presentation of lines 12, 14, 16, and 18, the listener can conveniently compare the differences between the word-for-word translations and the accurate, grammatically and syntaxically correct translations. To further emphasize and facilitate the teaching of the differences, an auditory signal such as a louder volume, a beep, or a tone can be advantageously used in the presentation to indicate which words will exhibit changes from one language to the next. For example, the emphasis is depicted in FIG. 5 by emboldened typeface at 32 and 34 and 36 and 38.

It has also been found that further advantages are obtained using a method or teaching aid in which a phrase is broken into words or a sentence is broken into phrases and then into words. Language 1 is preferably spoken by the same voice throughout the lesson. This aid and method can be better understood from the sample script between the first and second speakers on Sides 1 and 2 of an audiotape as set forth in Example 1 below, in which the language and speakers are schematically distinguished by bold and regular print:

Example 1

Side 1

| | |
|---|---|
| Primary (Lang 1): | The black dog is walking through the yard. |
| Secondary (Lang 2): | The black dog is walking through the yard. |
| Primary (Lang 1): | The |
| Secondary (Lang 2): | The |
| Primary (Lang 1): | black |
| Secondary (Lang 2): | black |
| Primary (Lang 1): | dog |
| Secondary (Lang 2): | dog |
| Primary (Lang 1): | The black dog |
| Secondary (Lang 2): | The black dog |
| Primary (Lang 1): | is |
| Secondary (Lang 2): | is |
| Primary (Lang 1): | walking |
| Secondary (Lang 2): | walking |
| Primary (Lang 1): | is walking |
| Secondary (Lang 2): | is walking |
| Primary (Lang 1): | The black dog is walking |
| Secondary (Lang 2): | The black dog is walking |
| Primary (Lang 1): | through |
| Secondary (Lang 2): | through |
| Primary (Lang 1): | the |
| Secondary (Lang 2): | the |
| Primary (Lang 1): | yard |
| Secondary (Lang 2): | yard |
| Primary (Lang 1): | The black dog |
| Secondary (Lang 2): | The black dog |
| Primary (Lang 1): | is walking |
| Secondary (Lang 2): | is walking |

-continued

| | |
|---|---|
| Primary (Lang 1): | through the yard |
| Secondary (Lang 2): | through the yard |
| Primary (Lang 1): | The black dog is walking |
| Secondary (Lang 2): | The black dog is walking |
| Primary (Lang 1): | through the yard. |
| Secondary (Lang 2): | through the yard. |
| Primary (Lang 1): | The black dog is walking through the yard. |
| Secondary (Lang 2): | The black dog is walking through the yard. |

Side 2

| | |
|---|---|
| Primary (Lang 2): | The dog black is walking through the yard. |
| Secondary (Lang 1): | The dog black is walking through the yard. |
| Primary (Lang 2): | The |
| Secondary (Lang 1): | The |
| Primary (Lang 2): | dog |
| Secondary (Lang 1): | dog |
| Primary (Lang 2): | black |
| Secondary (Lang 1): | black |
| Primary (Lang 2): | The dog black |
| Secondary (Lang 1): | The dog black |
| Primary (Lang 2): | is |
| Secondary (Lang 1): | is |
| Primary (Lang 2): | walking |
| Secondary (Lang 1): | walking |
| Primary (Lang 2): | is walking |
| Secondary (Lang 1): | is walking |
| Primary (Lang 2): | The dog black is walking |
| Secondary (Lang 1): | The dog black is walking |
| Primary (Lang 2): | through |
| Secondary (Lang 1): | through |
| Primary (Lang 2): | the |
| Secondary (Lang 1): | the |
| Primary (Lang 2): | yard |
| Secondary (Lang 1): | yard |
| Primary (Lang 2): | The dog black |
| Secondary (Lang 1): | The dog black |
| Primary (Lang 2): | is walking |
| Secondary (Lang 1): | is walking |
| Primary (Lang 2): | through the yard |
| Secondary (Lang 1): | through the yard |
| Primary (Lang 2): | The dog black is walking |
| Secondary (Lang 1): | The dog black is walking |
| Primary (Lang 2): | through the yard. |
| Secondary (Lang 1): | through the yard. |
| Primary (Lang 2): | The dog black is walking through the yard. |
| Secondary (Lang 1): | The dog black is walking through the yard. |

Thus, what has been disclosed is a foreign language teaching aid and method in which there are presentations of both word-for-word translations and accurately meaningful translations with correct syntax and grammer.

While the invention has been disclosed in connection with preferred embodiments, it is not intended to be limited to the specific embodiments set forth, but to the contrary, is intended to include such alternatives and equivalents as may fall within the scope of the claims below.

I claim:

1. A language translation teaching aid comprising:
   (a) a first presentation of a line of words, a phrase, or a sentence in a first language according to its normal rules of syntax and grammer;
   (b) a second presentation in a second language of a word-for-word translation of said first presentation in said first language;
   (c) a third presentation in said second language of an accurate translation of the first presentation according to the normal rules of syntax and grammar of said second language;
   (d) a fourth presentation in said first language of a word-for-word translation of said third presentation in said second language;
   (e) wherein the differences between the first and fourth presentations are denoted; and
   (f) wherein the differences between the second and third presentations are denoted.

2. A language translation teaching aid comprising:
   (a) a first presentation of a line of words, a phrase, or a sentence in a first language according to its normal rules of syntax and grammar;
   (b) a second presentation in a second language of a word-for-word translation of said first presentation in said first language;
   (c) a third presentation in said second language of an accurate translation of the first presentation according to the normal rules of syntax and grammar of said second language;
   (d) a fourth presentation in said first language of a word-for-word translation of said third presentation in said second language; and
   (d) wherein the words, in which there are differences between the first and fourth presentations in a first language or the words in which differences between the second and third presentations in a second language, are highlighted in each of the first, second, third, and fourth presentations to facilitate comparison.

* * * * *

UNITED STATES PATENT AND TRADEMARK OFFICE
CERTIFICATE OF CORRECTION

PATENT NO. : 5,275,569
DATED : JANUARY 4, 1994
INVENTOR(S) : C. KAY WATKINS

It is certified that error appears in the above-identified patent and that said Letters Patent is hereby corrected as shown below:

Column 1, line 16, replace "sentence" with ---sentences in a---.

In the Claims:

Claim 2, at Column 8, line 39, replace "(d)" with ---(e)---.

On title page, item [56]
    References Cited - OTHER REFERENCES:

Add the following reference under "OTHER REFERENCES":

Hassfield's New practical Method of German; Copyright 1989; page 27.

Signed and Sealed this

Third Day of May, 1994

*Attest:*

BRUCE LEHMAN

*Attesting Officer*     *Commissioner of Patents and Trademarks*